United States Patent [19]

Kobuck et al.

[11] Patent Number: 4,519,593
[45] Date of Patent: May 28, 1985

[54] GRID ASSEMBLY FIXTURE, RETENTION STRAP

[75] Inventors: Richard M. Kobuck, Delmont; Ralph W. Kalkbrenner, Irwin, both of Pa.

[73] Assignee: Westinghouse Electric Corp., Pittsburgh, Pa.

[21] Appl. No.: 414,198

[22] Filed: Sep. 1, 1982

[51] Int. Cl.³ .............................................. E04G 17/00
[52] U.S. Cl. ........................................ 269/40; 269/41; 269/118
[58] Field of Search ................. 269/37, 40, 41, 118, 269/119, 303, 21, 900, 910, 71; 228/49 B, 49 R, 44.1; 29/455 LM, 160, 559; 219/158, 161

[56] References Cited

U.S. PATENT DOCUMENTS

| | | | |
|---|---|---|---|
| 661,840 | 11/1900 | Baker | 269/21 |
| 1,631,652 | 6/1927 | Sprenger et al. | 269/21 |
| 1,648,409 | 11/1927 | Kuney | 269/40 |
| 1,836,619 | 12/1931 | Ritter | 269/40 |
| 2,158,229 | 5/1939 | Goldthwaite | 269/40 |
| 2,377,904 | 6/1945 | Roach | 269/40 |
| 2,488,296 | 11/1949 | Kraus | 269/71 |
| 2,961,745 | 11/1960 | Smith | 269/40 |
| 3,073,588 | 1/1963 | Morton | 269/40 |
| 3,299,920 | 1/1967 | Koenigshof | 269/40 |
| 3,650,521 | 3/1972 | Meli | 269/41 |
| 3,711,082 | 1/1973 | Seidenfaden | 269/21 |
| 3,740,900 | 6/1973 | Youmans et al. | 269/21 |
| 4,132,396 | 1/1979 | Graham | 269/41 |
| 4,280,279 | 7/1981 | Grundfest | 269/41 |

Primary Examiner—Robert C. Watson
Attorney, Agent, or Firm—Douglas E. Erickson

[57] ABSTRACT

A grid assembly fixture for use in assembling grid straps to form a grid comprises a generally flat plate having first and second sets of parallel grooves, with the grooves of the sets at right angles. A retention strap comprises first and second pairs of bars, the bars of each pair hinged together adjacent their ends, and releasable joining elements for joining the pair of bars.

13 Claims, 18 Drawing Figures

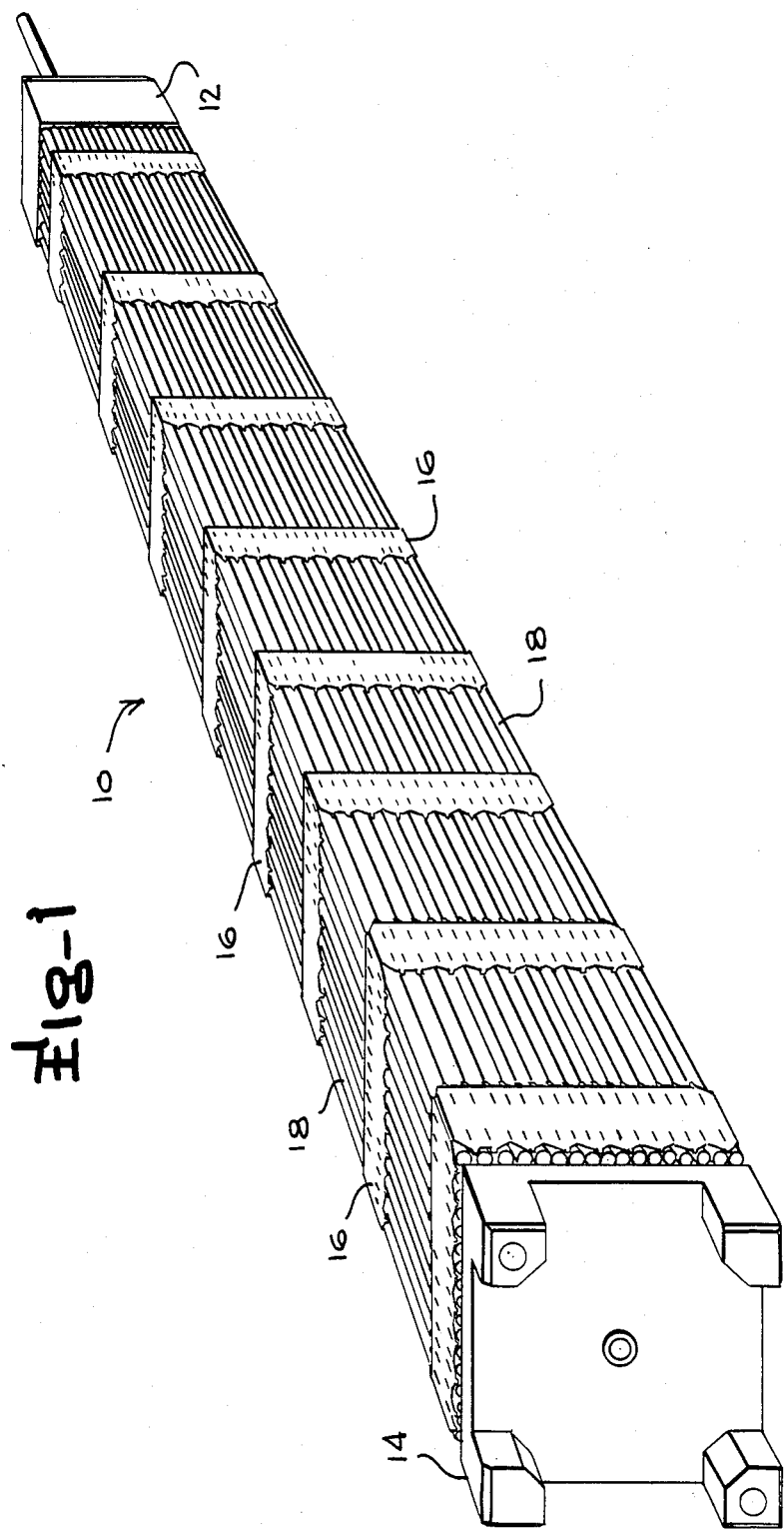

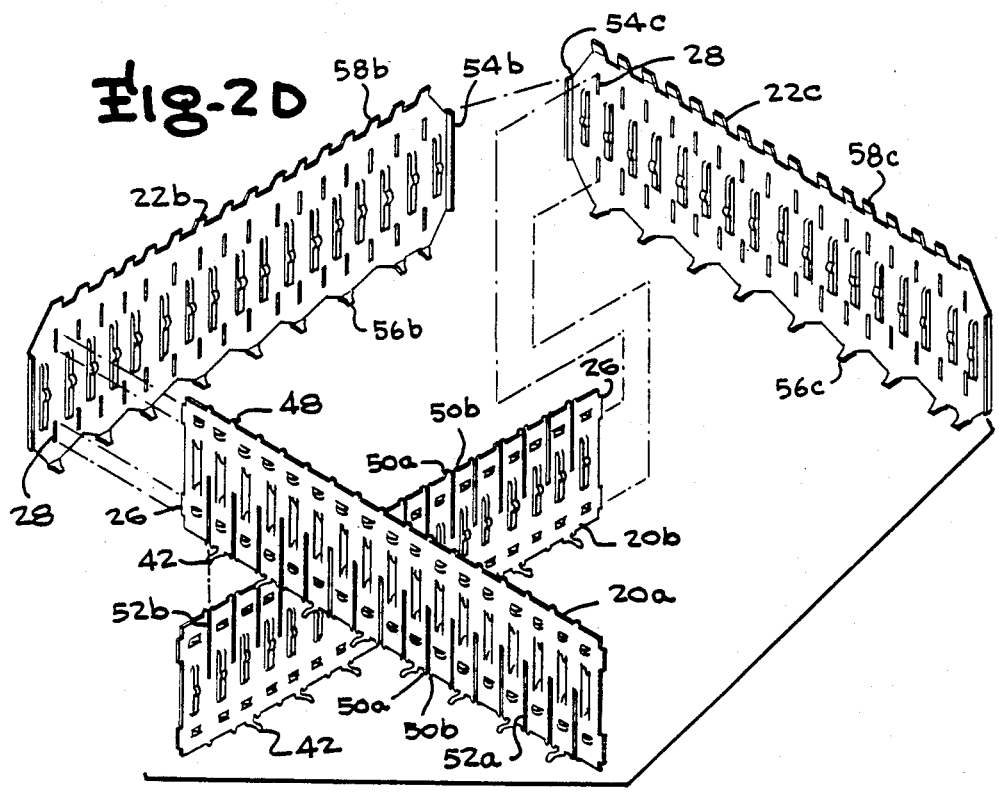
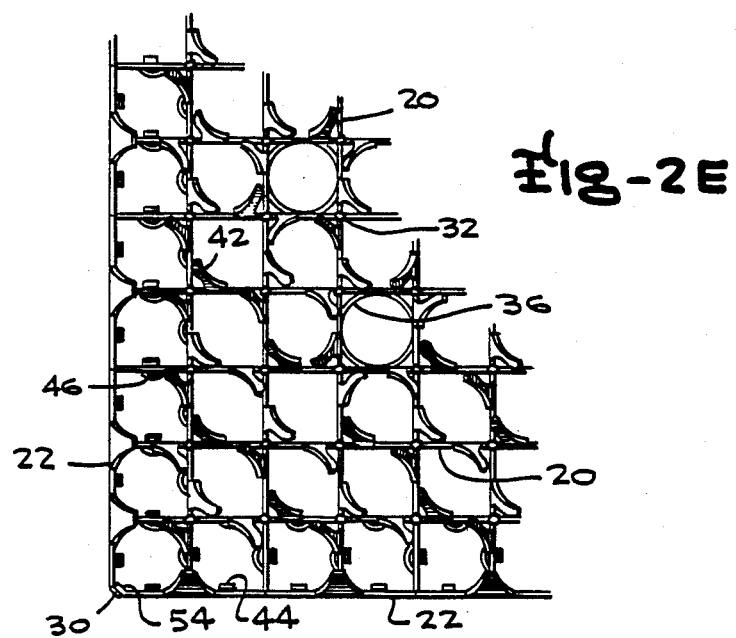

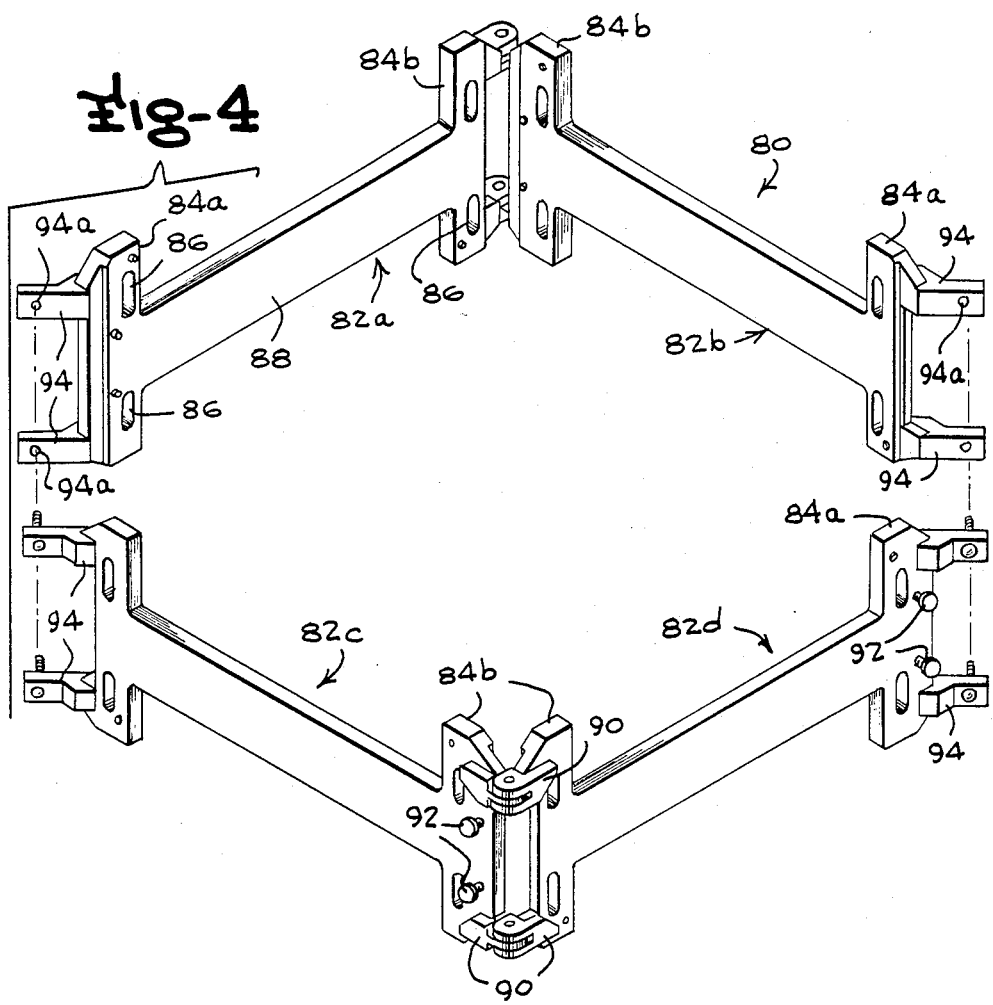
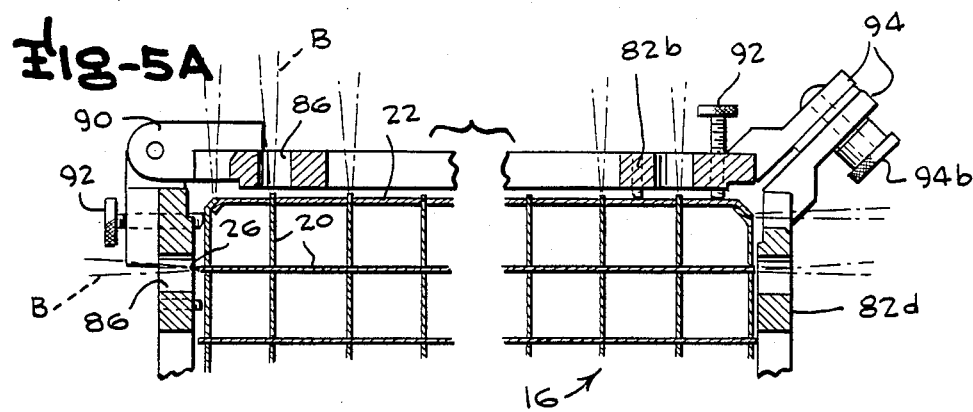

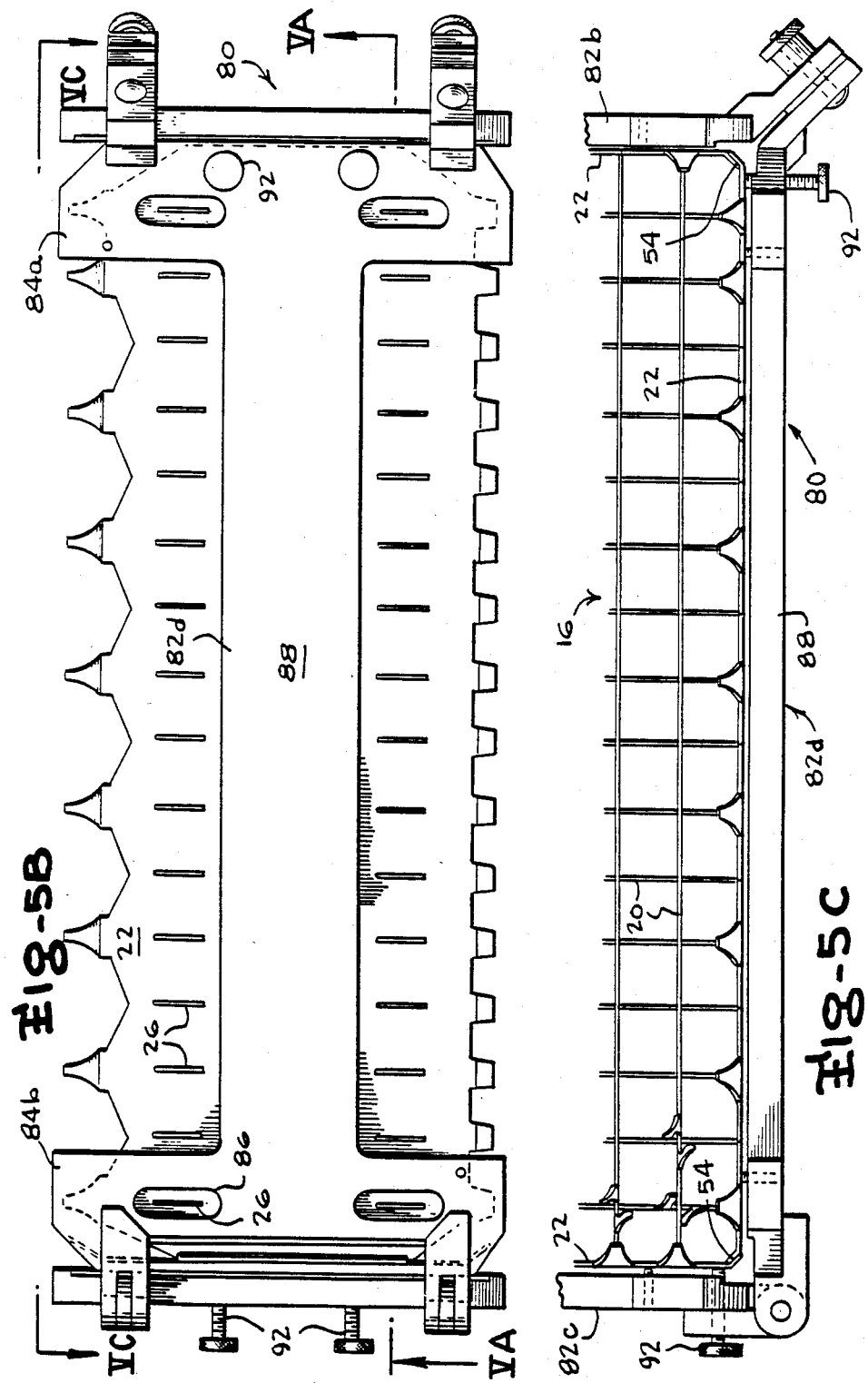

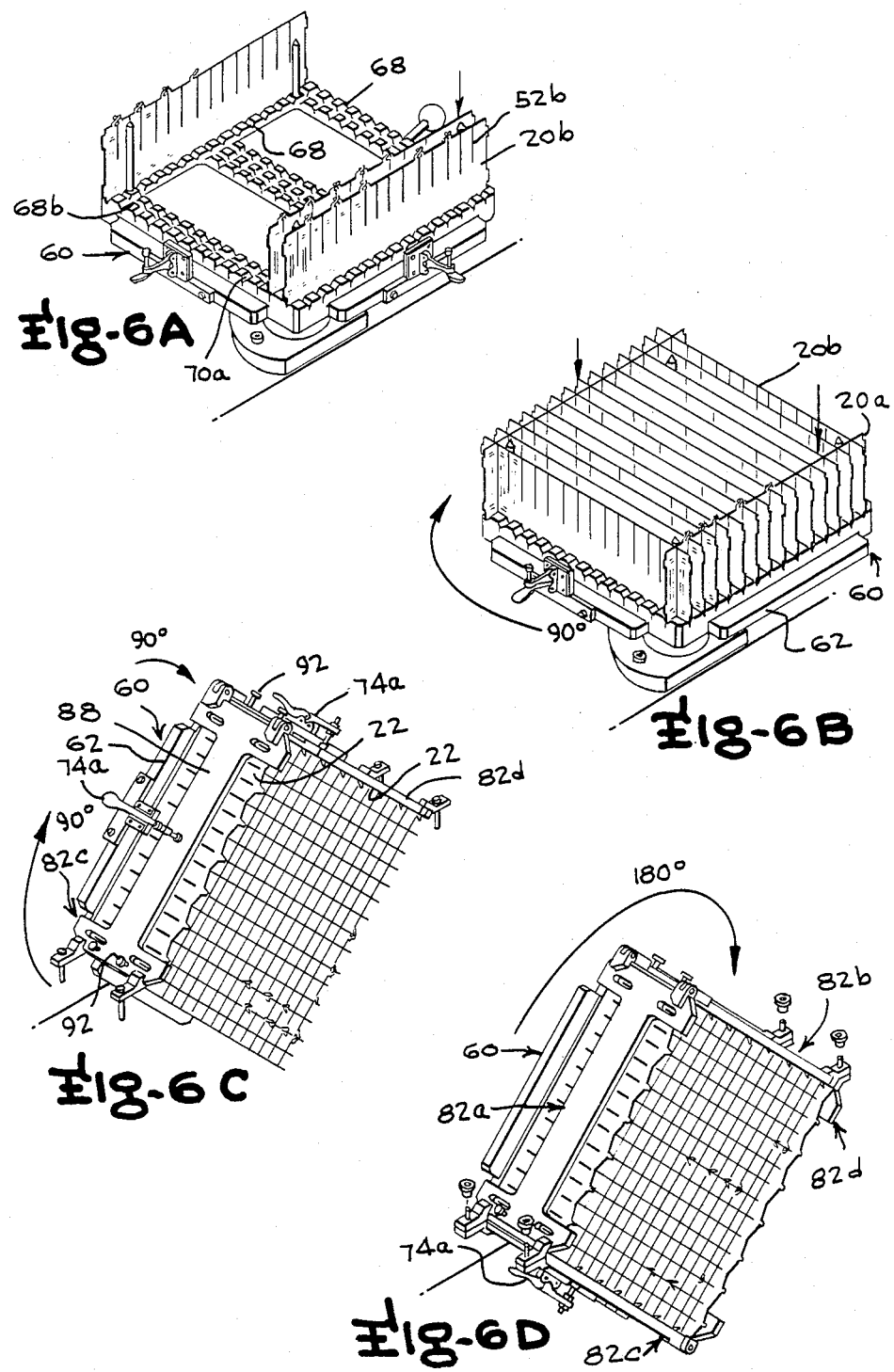

GRID ASSEMBLY FIXTURE, RETENTION STRAP

CROSS-REFERENCE TO COPENDING APPLICATIONS

Attention is drawn to the following copending, commonly assigned applications, all/each filed on even date and incorporated specifically by reference into the instant specification:

(1) "Fuel grid with sleeves welded in notched grid straps", by R. Duncan, Ser. No. 414,232;

(2) "Pulsed laser machining apparatus", by R. A. Miller and G. D. Bucher, Ser. No. 414,264;

(3) "Apparatus and method for laser machining in non-reactive environment", by R. A. Miller and G. G. Lessman, Ser. No. 414,242;

(4) "Strap and vane positioning fixture for fuel rod grid and method", by R. F. Antol, R. W. Kalkbrenner and R. M. Kobuck, Ser. No. 414,197;

(5) "Laser machining system", by D. L. Wolfe, J. W. Clements and J. S. Kerrey, Ser. No. 414,241;

(6) "Movable machining chamber with rotatable work piece fixture", by R. F. Antol, R. Kalkbrenner and D. L. Wolfe, Ser. No. 414,263; (7) "Workpiece gripping and manipulating apparatus for laser welding systems and the like", by R. Kalkbrenner and R. Kobuck, Ser. No. 414,262;

(8) "Laser lens and light assembly", by R. Antol, R. Kalkbrenner and R. Kobuck, Ser. No. 414,205;

(9) "Welding plates for a fuel rod grid" by R. M. Kobuck, R. Miller, R. W. Kalkbrenner, J. Kerrey and R. Duncan, Ser. No. 414,265;

(10) "Plural computer control for shared laser machining" by J. W. Clements and W. D. Lanyi, Ser. No. 414,204;

(11) "Grid and sleeves welding fixture and method" by J. S. Kerrey and R. Duncan, Ser. No. 414,203;

(12) "Calibration of automated laser machining apparatus" by J. W. Clements and J. R. Faulkner, Ser. No. 414,272; and

(13) "Rigid support for laser machining apparatus" by D. L. Wolfe, Ser. No. 414,191.

BACKGROUND OF THE INVENTION

1. Description of the Prior Art

This invention, in its preferred form, relates to apparatus and a related method for assembling inner grid straps so as to form a grid of generally square configuration, and for providing outer grid straps on the grid formed from the inner grid straps. More particularly, the invention relates to (a) a grid assembly fixture for holding a first set of inner grid straps in parallel relationship, and for holding a second set of grid straps parallel to each other and perpendicular to the straps of the first set, and for holding outer grid straps, (b) to a retention strap for retaining the grid formed of the inner and outer grid straps in assembled relationship, and (c) to a method of assembling a grid from grid straps using the grid assembly fixture and retention strap.

Nuclear fuel bundle assemblies include a matrix of nuclear fuel rods which are arrayed in rows and columns, and which are held in the desired configuration by a plurality of fuel rod grids. These grids are produced from "straps" which are linearly extending, generally rectangular elements, characterized by having slots extending from one edge approximately half way through the depth of the strap. The straps are assembled so that one strap is in mating relationship with the other strap. Thus, the slot of one strap engages the other strap at a portion thereof which is in alignment with the slot of that other strap, with the result that the grid is of the same depth as each of the straps which forms the grid. The resulting grid has a first set of straps which are substantially parallel to each other, and equally spaced, and a second set of straps which are parallel to each other and equally spaced, the straps of one set being perpendicular to the straps of the other set. All of the aforesaid straps are designated as "inner straps", and they are placed in mating relationship to form a square grid of square cells, in the above noted rows and columns. In addition, there are provided outer straps, which are placed on the four sides of the grid.

The inner straps and outer straps were formerly assembled by first joining together two straps in mating relationship, on a conventional table or plate. Typically, two additional straps were added, so that there resulted the four outer-most inner straps, which thereby formed a frame. The remaining inner straps were then placed in position, utilizing the frame provided by these first four placed straps. Then the outer straps where placed in position, and an encircling strap or holding strap was placed about the entire assembled grid. Further processing was then effected by placing brazing material at various locations on the grid, and the grid with the brazing material placed on it was then positioned in an oven, where brazing was effected.

The above-described method and related apparatus resulted in a very time consuming operation.

SUMMARY OF THE INVENTION

It is therefore an object of this invention to provide equipment which will permit the rapid assembly of inner and outer grid straps into a grid.

It is the most specific object of this invention to provide equipment, and attendant method, to permit assembly of inner and outer grid straps which will avoid excessive bending thereof.

It is a still further object of the present invention to provide grid assembly equipment and method which will permit ready assembly of inner and outer grid straps without undue binding thereof, and which will provide for retention of the assembled grid for welding by a laser beam welding.

It is yet another object of the present invention to provide a retention strap for an assembled fuel rod grid which will provide access for welding by a laser beam to all welded locations on the exterior of the grid.

In accordance with these and other objects of the invention, there is disclosed a grid assembly fixture comprised of a generally flat plate of square plan form, having in a surface thereof a first set of equally spaced, parallel grooves and a second set of equally spaced, parallel grooves, the grooves of the two sets being perpendicular to each other. Preferably, the grid assembly fixture has a peripherally extending raised portion. In addition, bores are provided at the intersections of each two grooves, with smaller bores provided along one groove, adjacent an edge of the plate, so as to serve as locating holes. The plate is mounted on a support for rotation on both vertical and horizontal axes, and in an attendant method, there are positioned on the plate the straps of a first set, then the plate is rotated, and there are placed, in mating relationship with the straps of the first set, the straps of the second set. Thereafter, outer straps are provided, being supported on the plate, the outer straps having slots, and the inner straps having at their ends extending tabs, at least some of the tabs of the inner straps being caused to enter into the mating slots of the outer straps. The plate and grid are then tilted so that two of the outer straps face upwardly, and two bars of a retention strap, to be hereinbelow described, are placed on the two outer straps, and are held in position by clamps. The plate is then rotated, so that the other two outer straps face upwardly, and two additional bars of a retention strap are placed on these latter two outer straps, and are joined to the first two bars of the retention strap, thereby forming a complete retention strap encircling and engaging the outer straps forming the grid, after which the assembly of retention strap and grid may be removed from the grid assembly plate.

The retention strap is formed of four H-shaped bars having two end posts and a cross member between them. A first two and a second two of the bars are hingedly connected together by a hinge structure which causes the adjacent ends of the bars to be spaced from each other. There are thereby formed two pairs of hinged bars. Further, the bars are provided with releasable fastening elements, so that the two pairs of bars may be joined together to form a retention strap of four bars. The releasable fasteners are constructed so that the adjacent ends of two adjacent bars are in spaced relation. By this construction, a laser beam may pass in the space between adjacent ends of bars at all four corners of the grid, to permit corner welding of the grid, and in addition, the slot and tab welding may be effected since the cross member of the bars are located between upper and lower tab and slot connections of the inner and outer grid straps.

BRIEF DESCRIPTION OF THE DRAWINGS

A detailed description of the preferred embodiment of this invention is hereafter made with specific reference being made to the drawings in which:

FIG. 1 is a perspective view of a nuclear fuel bundle assembly;

FIG. 2D is a perspective view showing inner and outer grid straps in disassembled relationship;

FIG. 2E is a plan view of a portion of a grid, taken from the unseen side of FIG. 2A;

FIG. 4 is a perspective view of a retention strap in accordance with the present invention, in partially disassembled relationship;

FIG. 5A is a cross-sectional view showing a part of the grid, and portions of the retention strap thereon taken on the line 5A—5A of FIG. 5B;

FIG. 5B is an elevational view of the grid with the retention strap thereon;

FIG. 5C is a view taken on the line 5C—5C of FIG. 5B;

FIG. 6A is a perspective view showing a first step in accordance with the method of the present invention;

FIG. 6B is a perspective view showing a second step, in which the grids of the second set are being positioned;

FIG. 6C is a perspective view showing the placement of a first pair of bars of a retention strap on the grid, after rotation of the grid; and FIG. 6D is a perspective view, after rotation of the structure of FIG. 6C through substantially 180° and the placement of two additional bars of the retention strap on the grid.

DESCRIPTION OF THE PREFERRED EMBODIMENTS

Figure 2A:
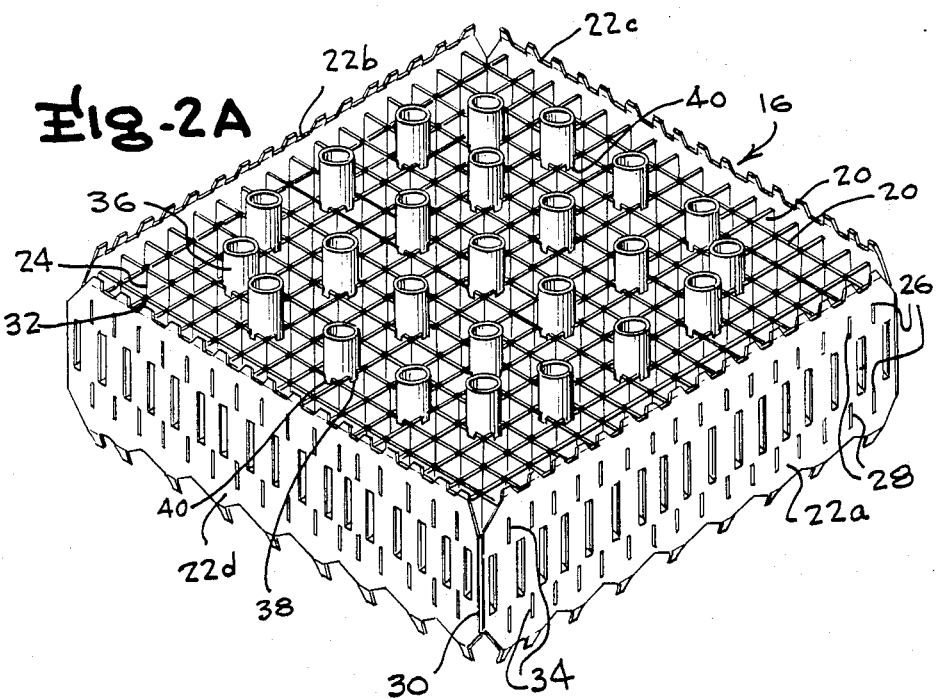
FIG. 2A is a perspective view of a completed grid.

For convenience, the following description of the invention and the related method and apparatus has been divided into sections as follows:
(1) Fuel Bundle Assembly and Fuel Rod Grid
(2) Grid Assembly Fixture and Retention Strap
(3) Grid Assembly Method

(1) FUEL BUNDLE ASSEMBLY AND FUEL ROD GRID

The apparatus and method of this invention is specifically designed as part of the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assembly 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and therefore, the orientation of the fuel rods 18 with respect to each other is rigorously controlled.

The present invention is, in one illustrative embodiment thereof, related to the manufacture of fuel rod grids 16 as shown in FIG. 2A. The fuel rod grid 16 is of an approximately square configuration whose periphery is formed by four outer grid straps 22a, 22b, 22c, and 22d. Each of an outer grid strap 22 is welded by a corner seam weld 30 to the end of a perpendicularly disposed outer grid strap. Two sets of spaced, parallel inner grid straps 20 are provided, the straps in the sets being perpendicular to each other, whereby a plurality of cells are formed to receive the control rods and the nuclear fuel rods 18. The inner grid straps 20 have mating slots therein providing points 24 of intersection. An intersect weld 32 is formed at each of the points 24 of intersection, whereby a rigid grid structure is formed. Further, each of the inner grids straps 20 includes at each end a pair of tabs 26 of a size and configuration to be tightly received in top and bottom slots 28 formed in the outer grid straps 22, as shown in FIG. 2A. A slot and tab weld 34 is effected along the top and bottom rows of slots 28 in the outer grid straps 22. Further, a plurality of guide sleeves 36 are disposed on the top most surface of the fuel rod grid 16 to receive and guide the control rods disposed therein. A series of seam welds 38 securely attach the guide sleeves 36 to corresponding notches 40 formed within the inner grid straps 20. A precision laser welding apparatus is particularly adapted to perform a series of controlled welding operations whereby each of the welds 30, 32, 34, and 38 is carried out. The precision laser welding apparatus as described and claimed in U.S. patent application Ser. No. 414,241 and 414,263 not only controls the various parameters of generating the laser in terms of the pulse width and pulse height of each laser pulse and the number of pulses to be applied to each weld, but also controls the sequential positioning of the fuel rod grids 16 with respect to the laser beam. Between each such weld, the fuel rod grid 16 is repositioned and/or the focal point of the laser beam changed to effect the particular type of weld desired.

Figure 2B:
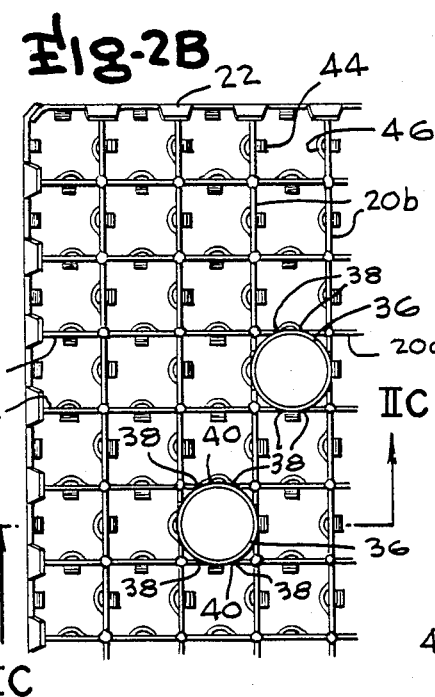
FIG. 2B is a plan view, showing a portion of the grid of FIG. 2A.
Figure 2C:
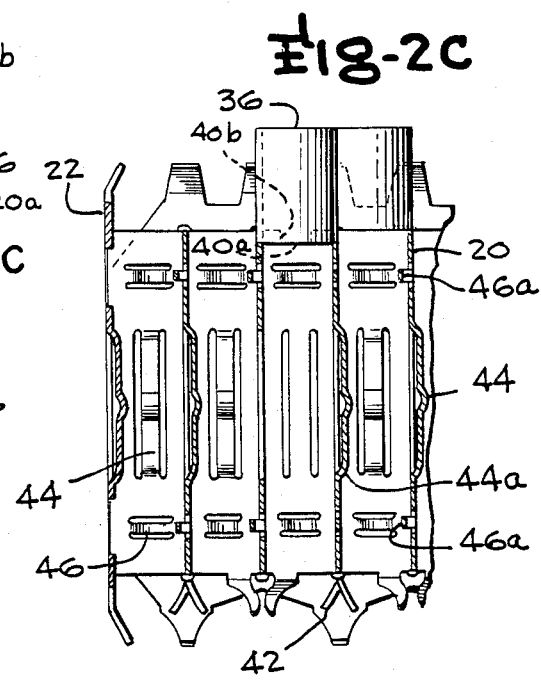
FIG. 2C is a cross-sectional view taken on the line 2C—2C of FIG. 2B.

FIG. 2B discloses a portion of the grid 16, showing two of the sleeves 36 joined to certain of the inner grid straps 20. FIG. 2C shows that there are provided in each of the cells formed by four intersecting straps resilient fingers 44 which have been stamped from the material of the straps, during the operation which has formed the straps from a continuous strip of metal. In addition, there are provided, at the bottom of the grid 16 as shown in FIG. 2C, vanes 42 which extend from the various straps 20 and 22, and lie at angles to the planes containing the straps from which they extend. Also provided are resilient spacing fingers 46.

In FIG. 2D, there is shown, in perspective, in exploded manner, outer grid straps 22b and 22c, and inner grid straps 20a and 20b. Inner grid strap 20a has projection tabs 48 along its upper edge and tab portions 50a and 50b at its lower edge, on either side of a bottom edge slot 52a. At the ends of the inner strap 20a, there may be seen the upper and lower tabs 26. On the inner grid strap 20b, mating slots 52b are provided at the upper edge, and it will be understood that in conventional fashion, the inner straps 20a and 20b are mated, extending perpendicularly to each other, at the mating slots 52a and 52b. The outer grid strap 22b and 22c are provided at their ends with corner tabs 54b and 54c. In FIG. 2E, these corner tabs 54 are shown in overlapped relationship, and are shown to extend at a 45° angle to the outer grid strap of which they form a part. The outer grid straps 22 have vanes 56 on their lower edges, and vanes 58 on their upper edges. As set forth above, each of the outer grid straps 22 is provided with upper and lower rows of slots 28 for receiving the tabs 26 of the inner straps 20. FIG. 2E discloses the cells formed by the two sets of parallel straps, the straps of one set mating with the straps of the other set and being perpendicular to them, and also discloses the vanes 42 which extend somewhat across the cells, so as to provide a turbulent flow of water passing through the cells.

(2) GRID ASSEMBLY FIXTURE AND RETENTION STRAP

Figure 3A:
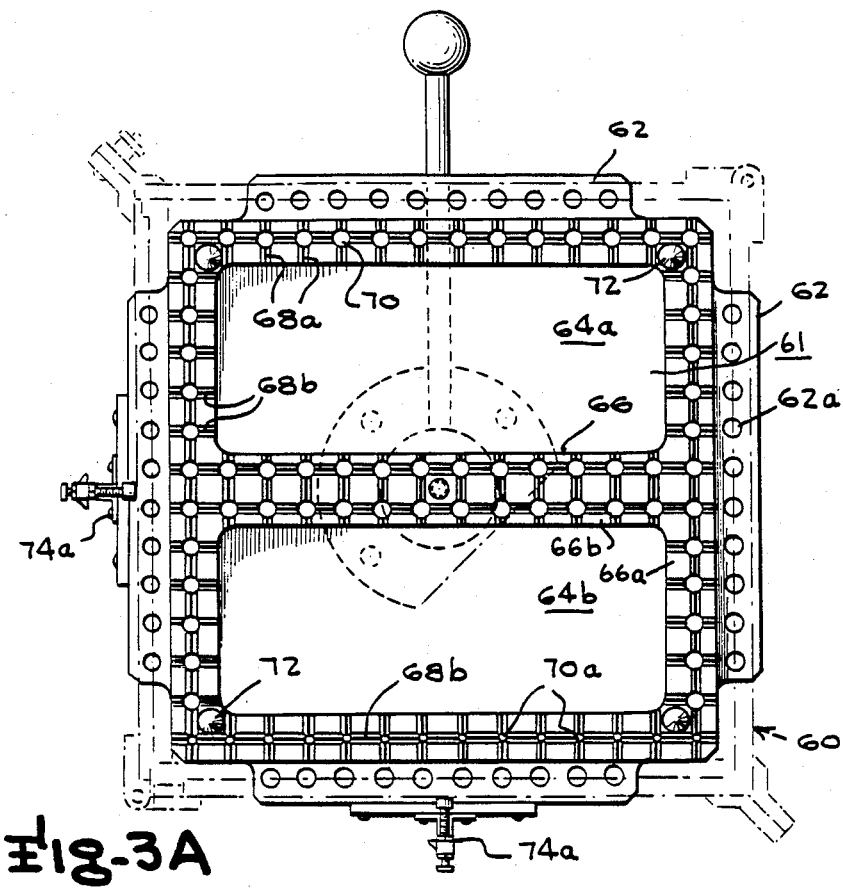
FIG. 3A is a plan view of a grid assembly fixture.
Figure 3B:
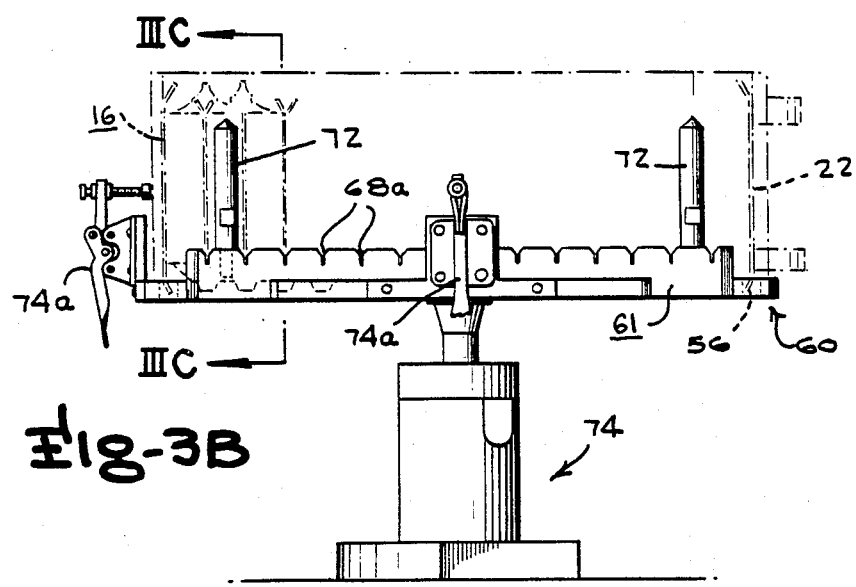
FIG. 3B is an elevational view of the grid assembly fixture, together with a support therefore.

In FIGS. 3A and 3B there is shown a grid assembly fixture 60 which includes a generally flat plate 61 of square plan form, and having extensions 62 at each side thereof. Each extension 62 is provided with a series of holes 62a extending therethrough. A pair of depressions 64a and 64b are provided in the upper surface of fixture 60, leaving a raised periphery 66a and a raised intermediate portion 66b. The raised portion 66 has a first set of spaced, parallel grooves 68a and a second set of spaced, parallel grooves 68b; these grooves are provided for receiving the inner grid straps 20. Where the grooves 68a intersect with the grooves 68b, bores 70 are provided; bores 70 are all the same size, except the bores 70a which are at the intersection of the lowermost groove 68b with the grooves 68a, as shown in FIG. 3A. The bores 70a are smaller than the bores 70 and serve as locating holes.

As shown in FIG. 3B, positioning pins 72 extend upwardly, adjacent each of the corners of the plate 61 of the grid assembly fixture 60. The grid assembly fixture 60 is mounted on a suitable support 74 by which it may be rotated on vertical and horizontal axes. The support 74 includes a pair of clamps 74a on adjacent sides of the plate 61 of fixture 60 for releasably holding the grid 16 on the fixture 60.

Figure 3C:
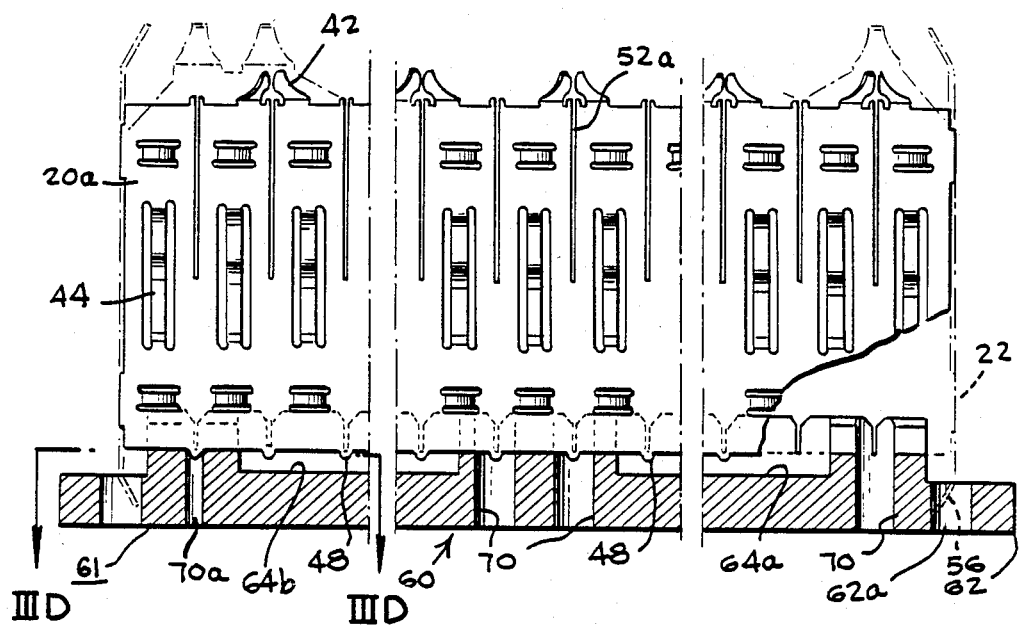
FIG. 3C is a cross-sectional view taken on the line of 3C—3C of FIG. 3B, and showing an inner grid strap in place.

FIG. 3C disclosed an inner strap 20a having slots 52a extending from the upper edge thereof. In the fixture 60, there may be seen the bores 70, which thereby receive the projecting tabs 48 extending from the bottom edge of the inner grid strap 20a. The bore 70a, which is noticeably smaller, receives the tab 48 which is adjacent the end of an inner strap 20a, to thereby serve as a locating hole, to facilitate the proper placement of each of the inner straps 20a in the fixture 60. This permits the bottom edge of inner grid strap 20a to rest at the bottom of the groove 68 in which it is positioned. As will be understood, the bottoms of the grooves 68a and 68b lie in a common plane, so that this common plane is that which is coincident with the plane formed by the bottom edges of the inner grid straps 20a and 20b. FIG. 3C also discloses that the recesses 64a and 64b receive a number of the projection tabs 48.

Figure 3D:
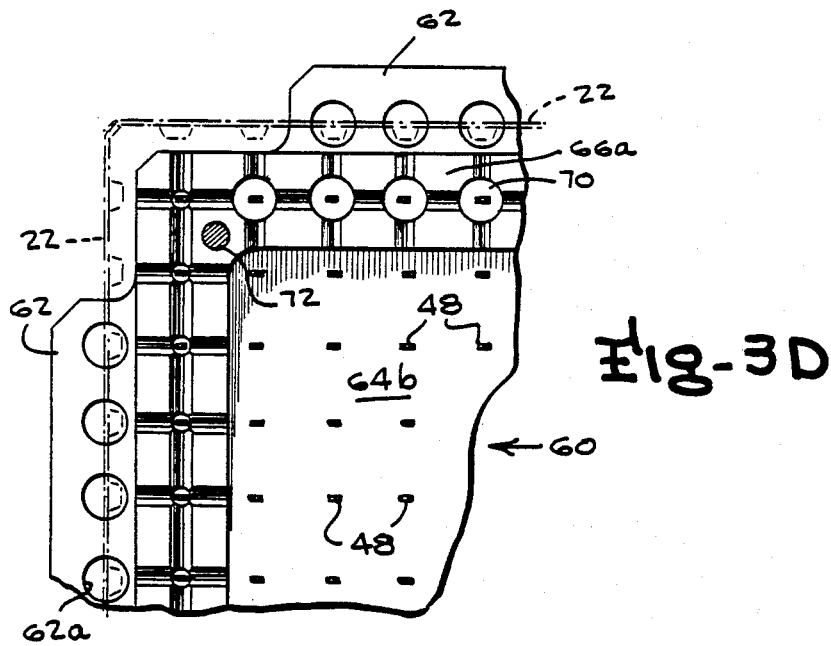
FIG. 3D is a cross-sectional view taken on the line of 3D—3D of FIG. 3C.

Referring now to FIG. 3D, there may be seen, in phantom lines, outer grid straps 22 resting on the extensions 62. The holes 62a receive the vanes 56 which extend from the bottom edges of the outer grid straps 22: see also FIGS. 3B and 3C.

In FIG. 4, there is shown a retention strap 80 which is comprised of four substantially identical bars 82a, 82b, 82c, and 82d. Referring to bar 82a, it will be seen to be of generally H-shape, including a pair of end posts 84a and 84b, each post 84 having upper and lower openings 86 therethrough. The posts 84a and 84b are connected by a cross member 88. The posts 84b of the bars 82a and 82b and the posts 84b of the bars 82c and 82d have hinge elements 90 extending from them, so as to hingedly connect the bars 82a and 82b together as a pair and to hingedly connect the bars 82c and 82d together as a pair. A substantial space is provided between the adjacent edges of the posts 84b, due to the extension of the hinge elements 90 therefrom.

At the post 84b of bar 82c and at the post 84a of bar 82d, screws 92 are provided, extending through the posts, and having threaded engagement in holes therein.

Spaced upper and lower connecting pieces 94 extend from each of the posts 84a, at an angle of 45° to the plane of the bar of which it forms a part (see also FIG. 5A), these connecting pieces 94 having apertures 94a therein, for the reception of threaded fasteners 94b. As shown in FIG. 5A, the connecting pieces 94 and fasteners 94b serve to connect together the bars 82b and 82d, and it will be understood, that in similar fashion, the connecting pieces 94 and fasteners 94b will serve to connect together the bars 82a and 82c, thereby releasably connecting the two pairs of bars. As shown in FIG. 5A, the openings 86 are in alignment with projection tabs 26 (upper and lower) on the inner grid straps 20, and are above and below the cross member 88, thereby providing access for the laser beam B to effect the slot and tab welds 34.

In FIG. 5B, there is shown a side view of the structure of FIG. 5A, in which the grid 16 has been formed by the mating intersection of the inner grid straps 20 and by the application onto the tabs 26 thereof of the outer grid straps 22. Thus, the retention strap 80 extends about the periphery of the assembled grid 16, holding the inner and outer straps 20 and 22 in the noted assembled relationship. The screws 92 are used to provide some adjustment in the amount of clamping force applied by the retention strap 80. In FIG. 5B, there may be seen the bar 82b with the posts 84d and 84a, each with the openings 86 therethrough aligned with the tabs 26. The cross member 88 will be seen to lie between the upper and the lower tabs 26, thereby exposing them to the action of the laser beam for welding the slot and tab welds 34. In FIG. 5C, there is shown the grid 16 formed of the inner grid straps 20 and the outer grid straps 22, the bars 82d, 82b, and 82c of retention strap 80, as well as the screws 92 bearing against two perpendicularly related outer grid straps 22. Further, there may be seen in FIGS. 5B and 5C the space between the adjacent edges of the bars 82 forming the retention strap 80 which permits entry of the laser beam for effecting the corner seam weld 30 of the corner tabs 54. This is accomplished by the extended construction of the hinge elements 90 and of the connecting pieces 94, and their vertical separation to permit access to the corner tabs 54.

(3) GRID ASSEMBLY METHOD

Referring to FIG. 6A, there is disclosed the grid assembly fixture 60, placed in a horizontal plane, or slightly tilted, there being inserted into the grooves 68 thereof inner grid straps 20b, which are thereby held in spaced, parallel relationship and which form a first set of straps. The mating slots 52b thereof are in their upper edges and the endmost projection tabs 48 are in the bores 70a. The lower unslotted edges are in the grooves. After insertion of all of the inner grid straps 20b, the fixture 60 is rotated 90°, and, referring to FIG. 6B, the inner grid straps 20a comprising a second set of straps are inserted, the mating slots 52a in their lower edges cooperating with the mating slots 52b of the inner grid straps 20b so that each strap enters into slots of straps of the other set. The positioning of the straps 20a and 20b is achieved through the guidance provided by the grooves 68, and by the mating relationship of the inner grid straps 20a and 20b, as well as the bores 70a.

Next, utilizing the ability of the support 74 to permit movement of the fixture 60 about a horizontal axis, the fixture 60 is tilted, so that the plane of fixture 60 is inclined to the horizontal, and may, for convenience, be anywhere between 45° to the horizontal and vertical. This is the position shown in FIG. 6C, and in this position, two of the outer grid straps 22 are placed on the tabs 26 of the inner grid straps 20, being those tabs which are extending in an upward direction. The tabs 26 will be caused to enter the slots 28 in the outer grid straps 22, and after this is accomplished, a portion of the retention strap 80 is placed in position on the partially completed grid 16.

More particularly, a pair of hingedly connected bars 82c and 82d, having the screws 92 therein, are placed on the two outer grid straps 22. Some pressure may be applied to the outer grid straps 22 by actuation of the clamps 74a, and if any of the tabs 26 have not passed through the slots 28, the pressure from the clamps 74a will assist in accomplishing this goal, possibly with the aid of a known tool, designated a "picking tool". As will be seen, the clamps 74a bear against the cross members 88 of the bars 82 to apply the noted light pressure. Thus, the bars are held in position against the outer grid straps 22.

Referring to FIG. 6D, the assembly shown in FIG. 6C has been rotated through approximately 180°, so that the bars 82a and 82b are on the lower portions of the partially completed grid 16. The two remaining outer grid straps 22 are applied, as before, with entry of some or all of the tabs 26 into the slots 28. In practice, a sufficient number and distribution of the tabs 26 will be caused to enter the slots 28 to ensure that these outer straps 22 will be held in their approximate position.

In placing the outer grid straps 22 in position, it will be understood that they will be placed on the extensions 62 of fixture 60, in the manner disclosed in FIG. 3C.

After rotation of the fixture 60 and the inner straps 20, outer straps 22, and bars 82c and 82d into the position shown in FIG. 6D, and the application of the final two outer grid straps 22, the final two bars 82 are placed on the upwardly facing outer grid straps 22. Thus, there may be seen in FIG. 6D the bars 82a and 82b, and after proper alignment of the apertures 94a, the fasteners 94b are cast through them, so as to complete the assembly of the retention strap 80. If necessary, any tabs 26 not in slots 28 may be positioned therein, preferably before the application of the final two bars 82. The assembly of the inner and outer straps 20 and 22 which form the grid 16 is thereby completed, and these straps are held in the appropriate position by the retention strap 80. The next step is to return the fixture 60 to the horizontal position, after which the clamps 74a may be released, and the assemblage of the inner grid straps 20, outer grid straps 22 and retention strap 80 may be lifted from the fixture 60 and is thereby available for further processing.

There has been provided a grid assembly fixture which permits the rapid and accurate assembly of inner grid straps in mating relationship, to form a grid. There has also been provided a grid assembly fixture accommodating outer grid straps, which also permit rapid and accurate assembly of the straps to form a part of the completed grid. The grid assembly fixture enables the assembly of the grid straps into a grid without excessive bending of the grid straps. Further, binding of grid straps is avoided through utilization of the herein-disclosed grid assembly fixture. There has also been disclosed a retention strap for association with the assembled grid which is readily applied to the grid, and which will avoid obstructing a laser beam for welding those areas of the grid with which the retention strap is engaged; the construction of the retention strap provides for two readily handled pairs of bars forming, when joined, the completed retention strap.

There has also been provided herein a method of assembling inner and outer grid straps in a rapid and facile manner, without undue bending of the grid straps, and with retention of the grid straps as a completed grid, the method permitting rapid assembly, without significant strap bending or binding.

In considering this invention, it should be remembered that the present disclosure is illustrative only and the scope of the invention should be determined by the appended claims.

We claim as our invention:

1. A grid assembly fixture for use in assembling mating, perpendicular inner straps and outer straps into a grid assembly comprising:
 (a) a generally flat plate;

(b) first and second sets of spaced parallel grooves in a surface of said plate, said grooves of said sets being at right angles to each other, the bottom of said grooves lying in a common plane, and said grooves of said sets intersecting; and (c) retention strap means for extending about the periphery of a grid assembled on said grid assembly fixture, with said retention strap means comprising first and second pairs of bars, the bars of each pair comprising hinge means for hingedly connecting the bars of each pair, with each said bar having a pair of end posts and a connecting cross member extending between them, and with said end posts having openings therethrough located above and below the connecting cross member.

2. The grid assembly fixture of claim 1, and bores extending through said plate at the intersections of said grooves.

3. The grid assembly fixture of claim 2, wherein the bores at intersections of an endmost groove are smaller than the bores at the intersections of other grooves.

4. The grid assembly fixture of claim 1, and positioning pins extending upwardly from said surface of said plate.

5. The grid assembly fixture of claim 1, wherein said plate is provided with at least one depression in said surface, and has a raised periphery in which said grooves extended.

6. The grid assembly fixture of claim 1, said plate being of generally square plan form, and having extensions at each side thereof.

7. The grid assembly fixture of claim 6, and a series of holes extending through each said extension.

8. The grid assembly fixture of claim 1, and further comprising a support for said plate.

9. The grid assembly fixture of claim 8, said support including releasable clamp means thereon.

10. The grid assembly fixture of claim 8, said support comprising means for enabling said plate to be moved about horizontal and vertical axes.

11. The grid assembly fixture of claim 1, said retention strap means further comprising means for releasably joining the bars of one pair to the bars of the other pair.

12. The grid assembly fixture of claim 11, said hinge means and said joining means connecting the adjacent ends of said bars comprising means for connecting said bars with a substantial space between the adjacent edges of adjacent bars.

13. The grid assembly fixture of claim 12, said hinge means and said joining means connecting the adjacent ends of said bars further comprising vertically spaced connecting means for said bars.

* * * * *